United States Patent [19]

Shultz

[11] 4,308,543

[45] Dec. 29, 1981

[54] ROTATING INK JET PRINTING APPARATUS

[75] Inventor: Richard E. Shultz, Orlando, Fla.

[73] Assignee: Burroughs Corporation, Hollywood, Fla.

[21] Appl. No.: 178,851

[22] Filed: Aug. 18, 1980

[51] Int. Cl.$^3$ .............................................. G01D 15/18

[52] U.S. Cl. .................................. 346/75; 346/140 R

[58] Field of Search .............................. 346/75, 140 IJ

[56] References Cited

U.S. PATENT DOCUMENTS

| | | | |
|---|---|---|---|
| 3,373,437 | 3/1968 | Sweet et al. | 346/75 |
| 3,864,696 | 2/1975 | Fischbeck | 346/75 X |
| 3,971,040 | 7/1976 | Skala | 346/140 IJ X |
| 4,210,919 | 7/1980 | Aiba | 346/75 |

*Primary Examiner*—George H. Miller, Jr.

[57] ABSTRACT

Wherein a plurality of ink jet nozzles are carried on a rotatable disklike member so that ink is ejected in a stream of droplets radially from each nozzle. Ink droplets are charged in a binary manner (i.e. charged or not charged) by a fixed array of charging members which are electrically switched so as to track a specific jet. Fixed deflection members delete charged drops from the ink droplet stream leaving neutral droplets unaffected. Print receiving material is wrapped with a slight skew around a stationary cylindrical shell and moved along a slight helical path on the cylindrical shell's surface. The shell encloses and surrounds the rotating disklike member, the fixed charging members, the fixed deflecting members and a suitably disposed fixed ink catcher. The neutral droplets of ink are adapted to pass through a bank gap in the cylinder such that the circular ink jet droplet scan effectively becomes a helical scan on the moving paper so as to produce line by line printing.

13 Claims, 16 Drawing Figures

$V_S$ = VELOCITY OF SCAN $D_J$ = DISTANCE BETWEEN JETS $P$ = $D_J/V_S$ = PERIOD BETWEEN 2 JETS PASSING ONE POINT $W_S$ = WIDTH OF SENSOR < $D_J = P \times V_S$ FIG. 7a.
FIG. 7b
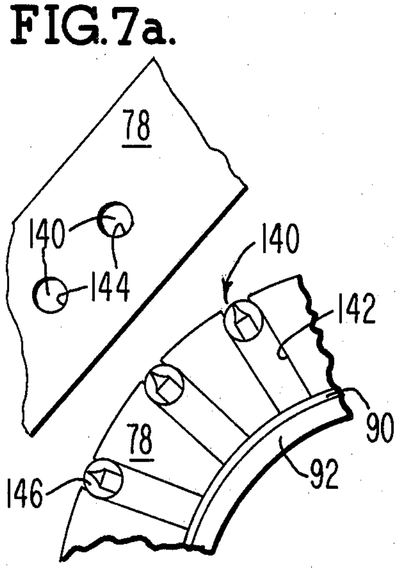
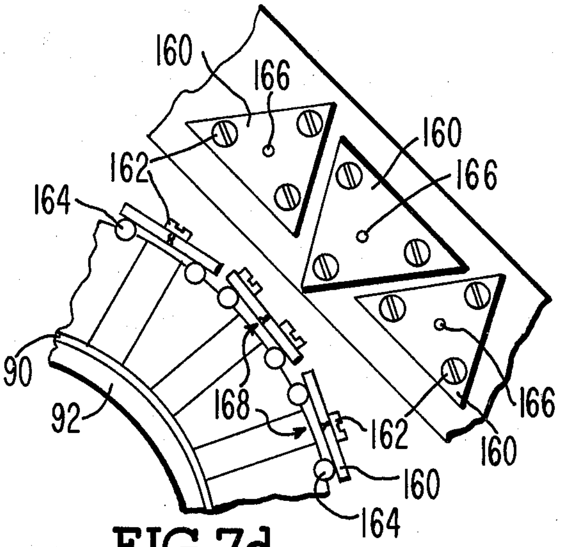
FIG. 7c.
FIG. 7d
PRIOR ART
FIG. 8.
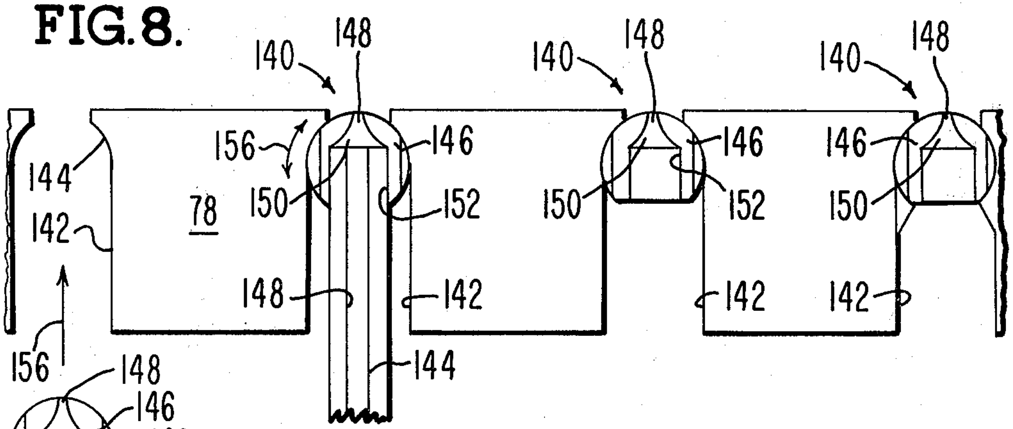
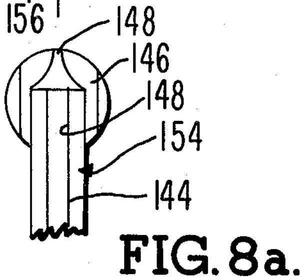
FIG. 8a.

ROTATING INK JET PRINTING APPARATUS

BACKGROUND OF THE INVENTION

1. Field of the Invention

The present invention relates generally to ink jet printing apparatus and more particularly to ink jet printing apparatus wherein the ink droplet producing portion of the apparatus is rotatable with respect to the print receiving media.

2. Description of the Prior Art

The most pertinent known prior art is U.S. Pat. No. 3,373,437 to R. G. Sweet, et al. entitled, Fluid Droplet Recorder with a Plurality of Jets, filed Aug. 1, 1967, issued Mar. 12, 1968. The apparatus described in the Sweet patent includes means for mounting a plurality of ink droplet jet producing nozzles for printing upon a cylindrically defined and supported record member. The Sweet apparatus uses rotatably mounted charge plates as well as rotatably mounted deflection plates. Operation of this configuration would require rotatably mounted high and medium voltage power supplies or the conduction of high and medium voltage signals across slip rings. These problems apparently have been sufficiently difficult to overcome that there is no known presently available rotary ink jet printing apparatus.

Continuous ink jet with variable charge voltage and constant deflection voltage is employed by many ink jet printers. The IBM 6640 and Mead Dijit represent two printers in this class. The IBM 6640 is well known for the high quality character printing produced while Mead Dijit is known for very fast printing of characters and graphics. A rotary binary ink jet would provide the best of both of these types of apparatus.

SUMMARY OF THE INVENTION

The rotary binary ink jet apparatus of the present invention utilizes an array of ink jets which allow for higher printing speeds than the IBM 6640 ink jet apparatus. The binary jets are compensated for changes in phase and break-off length. This produces more accurate dot placement than the Mead ink jet printer. Because of the binary drop charging, the rotary binary jet would not be concerned with or bothered by sensitivity to ink jet velocity variation, or phase sensitivity or electrostatic drop-to-drop interaction.

Because the rotary binary ink jet apparatus employs a rotating binary jet, it avoids the aerodynamic drop-to-drop interaction. Also, it can provide large or very small dot center-to-center distances which can be used to give high visual resolution of the resulting printing. Thus, the binary charging of rotating jets has a number of distinct advantages over the prior art. It is a purely mechanical scan type apparatus. There is less jet velocity variation sensitivity and drop-to-drop electrostatic interaction. Also, there is less phase sensitivity and the apparatus utilizes both a lower charging voltage as well as a lower deflection voltage. Finally, there is a shorter ink droplet flight path and much less aerodynamic interaction between drops. The end result is improved print quality wherein the ink dots can be packed densely and placed on the receiving medium very accurately.

Finally, this type of printing apparatus results in a much simpler and easier to fabricate device inasmuch as the ink jets can be spaced widely, the fixed charging members are easier to charge than rotating charge members, the charge sensing catcher need sense only two charge states and finally, the charging and deflecting voltages are relatively low.

Other objects, features and advantages of the present invention will be readily apparent in the following detailed description when considered in light of the accompanying drawings, which illustrate by way of example and not limitation, the principles of the invention and present modes for applying these principles.

Figure 5:
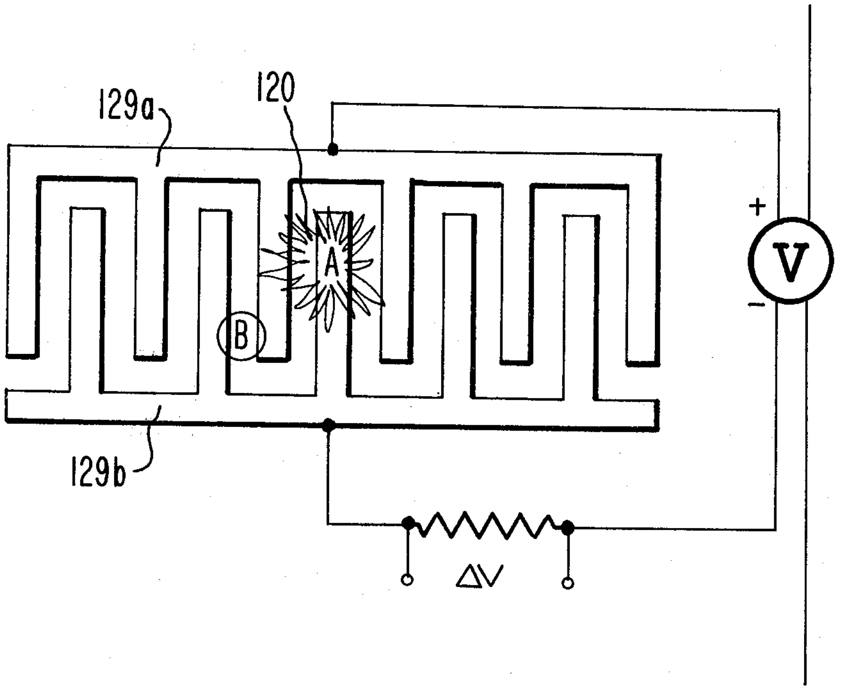
Figure 4:
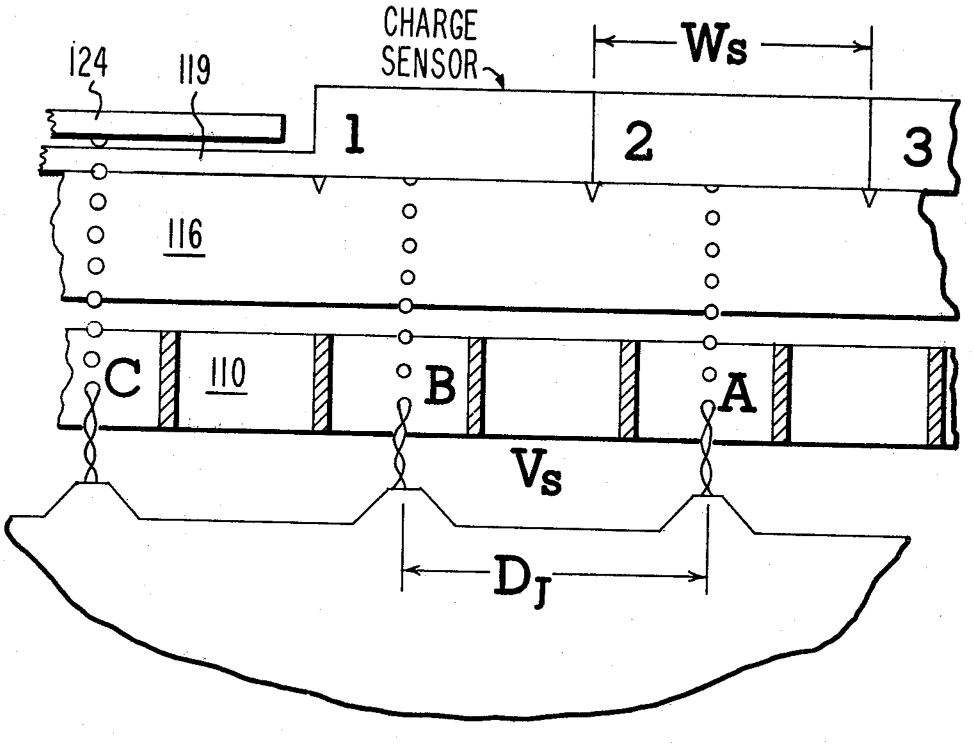
Figure 6:
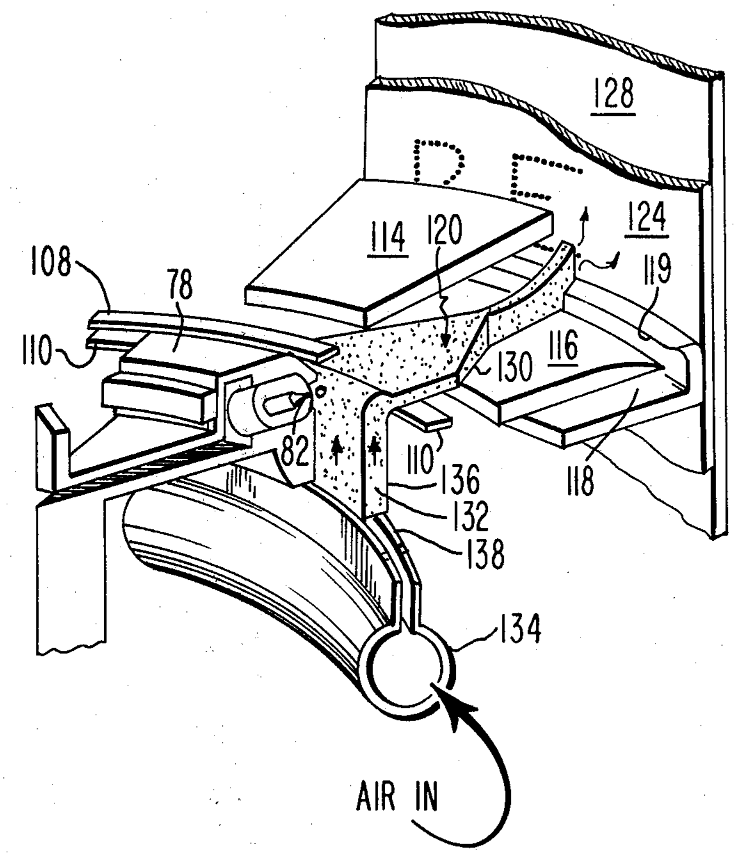
Figure 9:
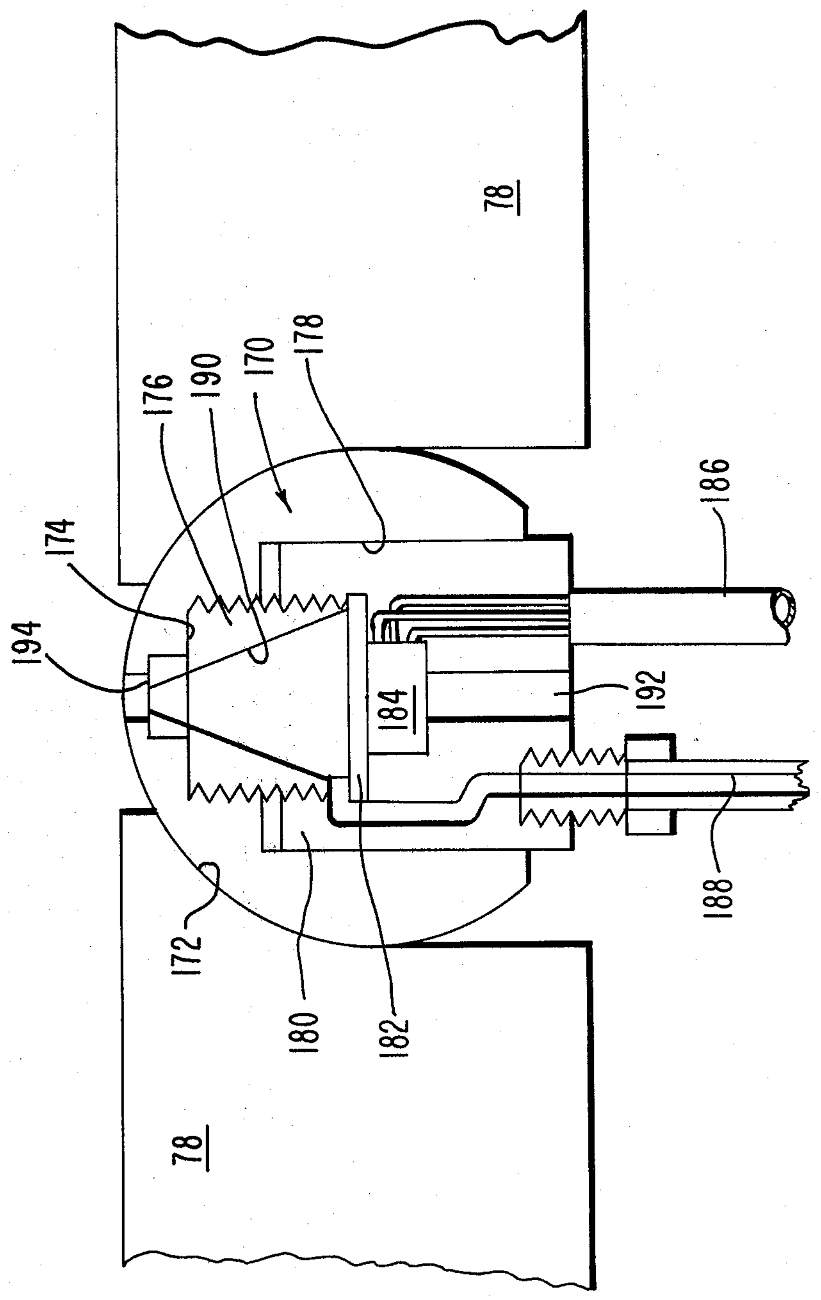

FIGS. *3a–3c* inclusive are schematic illustrations of the ink jet charge plate tracking technique;

FIG. 4 is a schematic illustration of the phasing technique of the present invention;

FIG. 5 is a diagrammatic illustration of a time of flight sensor apparatus for the present invention;

FIG. 6 is a partial perspective view of the ink jet printer as modified to accommodate changes introduced by aerodynamic force on the ink jet;

FIGS. *7a* and *7c* are views of portions of the ball and socket type jet head of the present invention;

FIG. *7b* and *7d* are views of portions of prior art ink jet apparatus;

FIG. 8 is a top plan view of a portion of the adjustable ink jet head arrangement of the invention;

FIG. *8a* illustrates the spherical head adjusting tool for use with the present invention; and FIG. 9 is a greatly enlarged view, not to scale, of a modified form of the spherical ink jet head structure embodying the present invention.

DESCRIPTION OF A PREFERRED EMBODIMENT OF THE INVENTION

Figure 1:
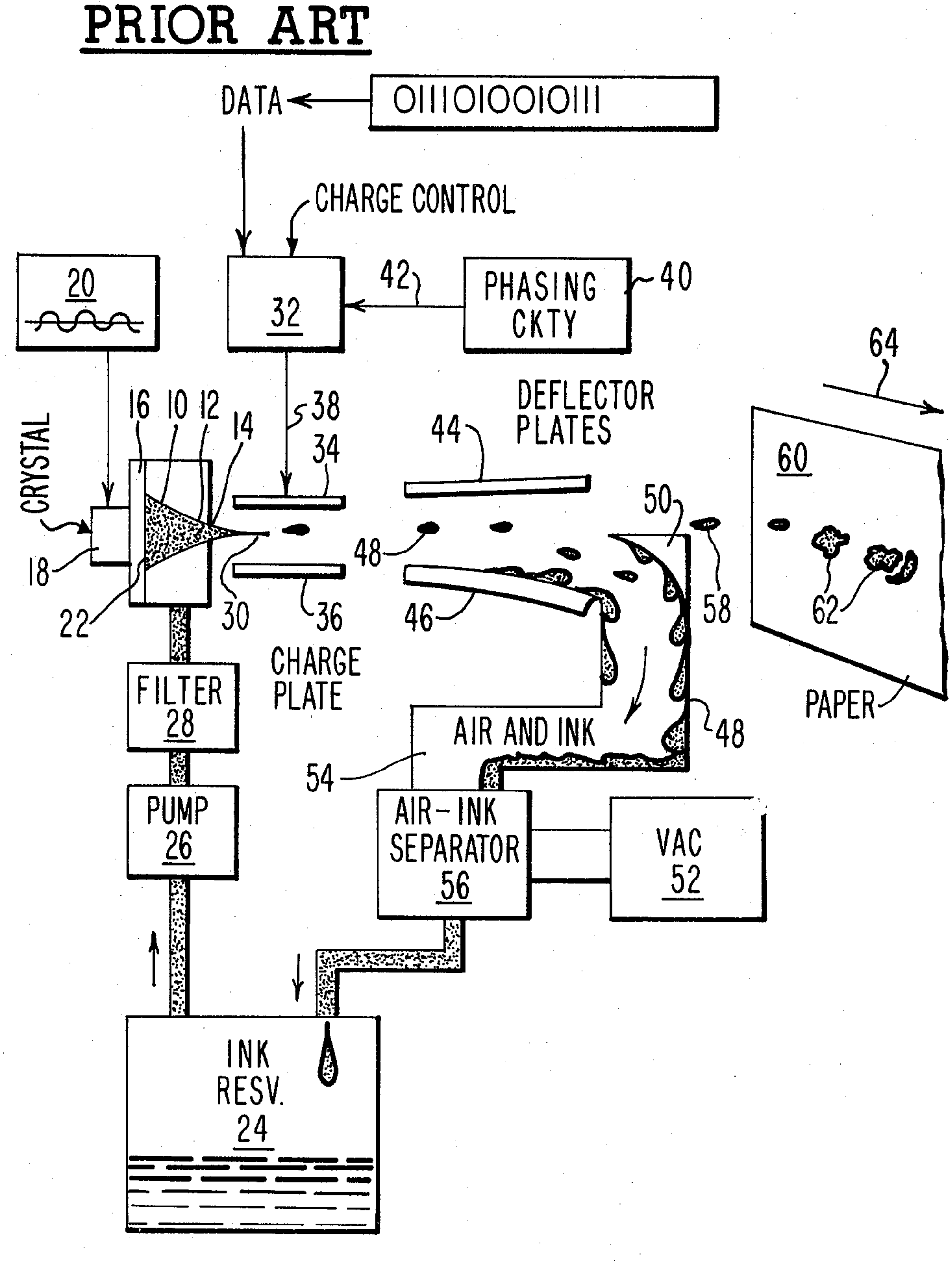
FIG.1. PRIOR ART
FIG. 1 is a schematic diagrammatic illustration of a prior art binary synchronous ink jet apparatus.

One form of prior art ink jet printing apparatus is shown schematically in FIG. 1. No attempt has been made in this figure to illustrate all of the actual hardware, but only so much of the hardware being shown as to demonstrate the basic principles of operation of such apparatus. Additionally, no attempt has been made to bring the illustration into any particular scale.

An ink receiving chamber 10 is illustrated as funnel shaped as shown at 12, tapering or being necked down to an ink outlet orifice 14. Located at one side (left in FIG. 1) and in contact with the rear surface portion of the ink chamber 10 is a flexible or movable diaphragm 16. A crystal oscillator 18 of known construction is secured to the rear of diaphragm 16 for applying a pressure gradient to the diaphragm to move the diaphragm horizontally backwards and forwards. A crystal driver 20 (electronic circuitry) applies a constant sign wave signal to the oscillator 18 causing the diaphragm 16 to move in a back and forth direction in response to the undulations of the crystal. Electrically conductive ink 22 from an ink reservoir 24 is forced by pump 26 through filter 28 into ink chamber 10 under a relatively high pressure head, e.g. 150 lbs. per square inch, causing the ink to be ejected from the orifice 14 in an elongated pulsating stream 30.

Arranged adjacent to the ink chamber 10 and coaxially aligned with the ink outlet orifice 14 is an ink charging device 32. Member 32 may comprise a pair of oppositely disposed plates 34 and 36 as shown, or member 32 may take the form of a short length of cylindrical conductive material. Charge control circuitry 32 is electrically connected to the charging device 32 over line 38. Electronic phasing circuitry 40, for purposes to be explained presently, is connected to charging control 32 over line 42 as seen in FIG. 1. Input data for a binary ink jet printing device comes in the form of a bit stream consisting of "0's" and "1's" as seen to the right of the "data" indicator in FIG. 1. Thus, the ink droplets bear either a charge (positive or negative as predetermined) or are uncharged, i.e. electrically neutral. The charged droplets are deflected out of the droplet stream while the uncharged neutral drops are utilized for printing, as will be described presently.

Axially aligned with charging apparatus 34 and 36 are a pair of upper and lower deflection plates 44 and 46 respectively. Located in the forward path of movement of ink droplets 48 (rightwardly in FIG. 1) which have been broken away from the main stream of ink in a manner to be described later on, as they move from stream 30, is an ink receiving catcher or gutter apparatus 50 for purposes to be explained presently. Ink droplets 48 which are deflected into gutter 50 are moved under force of vacuum from vacuum source 52 through piping conduit 54 connected therewith into an air-ink separator 56 thence back downwardly into the main ink reservoir 24 for reuse in the system as will be described later on.

In the present binary synchronous ink jet as the ink 30 is breaking up into droplets 48, the charging electrodes 34 and 36 can induce a plug charge on the conductive ink. Once the ink droplet breaks off from the main stream, the charge in the ink is trapped in the ink. Thus, by choosing when and how much to charge electrodes 34 and 36, the charge in each droplet can be controlled fairly precisely. Since the neutral ink droplets are to be utilized to print, as will be described, the deflection plates 44 and 46 are electrically energized with a zero potential and a minus potential respectively, creating an electric field relative to the ink droplets and deflecting the charged droplets into the gutter 50 permitting the neutral droplets 58 to move past the gutter 50 and into contact with the recording medium 60. It is thus seen that if the charge plates are at zero potential the droplets feel no force, they fly straight to the medium 60. Conversely, the reverse situation can be utilized wherein the drops can be charged or not, as desired, and the charged drops are selectively made to strike the medium 60 at prearranged positions or position levels for printing while the neutral drops are passed into the gutter. By moving the recording medium 60 sideways relative to the rotating ink jets, a scanning pattern is developed permitting the selective printing of data on the recording medium.

The binary synchronous ink jet system provides certain desirable advantages over other known ink jet apparatus.

1. Only one position on the recording medium is utilized.
2. A variable charge (on-off) is employed to deflect unwanted drops (0s) into a gutter while neutral drops (1s) are uncharged and undeflected and go directly onto the recording medium.
3. Wide tolerances are permitted with respect to charge, deflection, pressure, viscosity and temperature.
4. Simple phasing is utilized for the ink drop movement.

Figure 3:
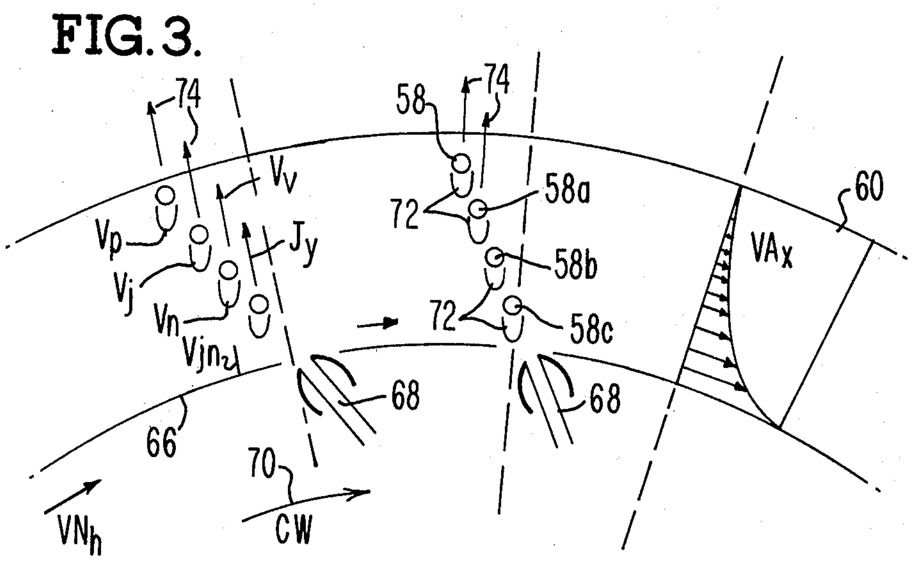
FIG. 3 is a schematic illustration of the effect of turbulent air near a rotating ink jet.

Two problems immediately present themselves with the foregoing apparatus. One problem is that of aerodynamics, while the other is that of the electrical or electrostatic interaction between drops, as will now be described. As seen in FIG. 3, as two or more drops 48 move along through the ambiant atmosphere one behind the other, the first drop creates a wake (aerodynamic problem) with respect to the following droplet. The drops are moving in a more or less stagnant atmosphere or air so that the wake of the first droplet disturbs the flight path or pattern of the second droplet and the second droplet tends to catch up with the first. As the flight time between the drops varies, there results an error in the placement of the drop on the recording medium 60. If the two drops happen to bear, for example, a powerful plus charge, they tend to push against each other or push each other apart, which again interferes with drop positioning at the recording medium 60. The drops thus do not fall in the selected or desired pattern or position on the medium. The end result of this actuation is an effective reduction in resolution with respect to the printing. Drops are misplaced.

The binary ink jet system to be described herein avoids these problems inasmuch as the drops that go to the medium 60 are neutral. Thus, there is no electrostatic interaction, the second problem. The drops that are charged negatively that go to the gutter cause no problem with associated drops since any interaction is nullified by their obvious nonutilization and gutter termination.

Figure 2:
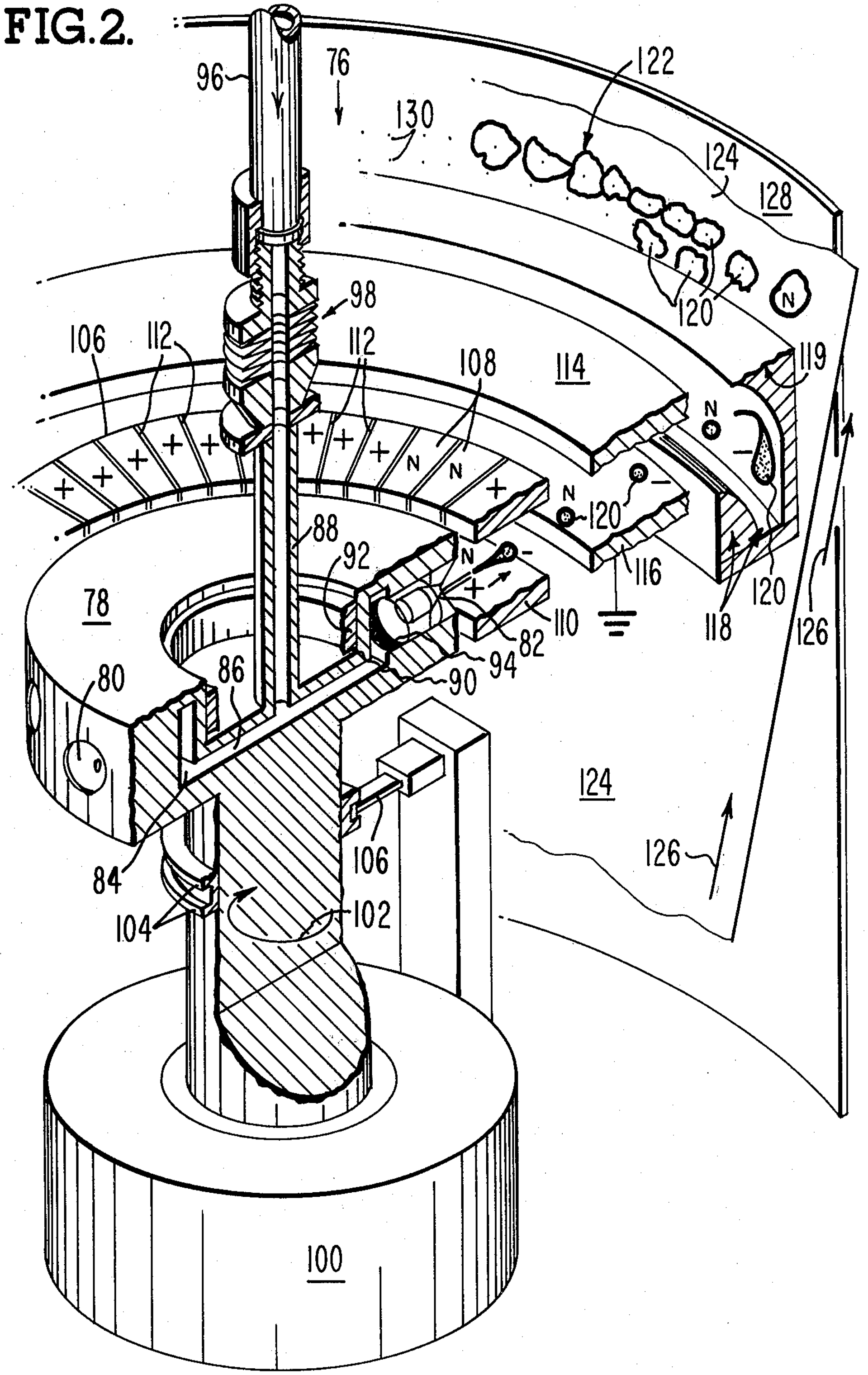
FIG. 2 is a diagrammatic view of apparatus embodying the present invention partly in section to illustrate certain features of the invention.

The aerodynamic problem is solved by the novel apparatus described in detail in FIG. 2 which is a schematic diagrammatic illustration of a rotary scan of binary ink jets with fixed chargers, deflectors, catcher and phaser as proposed by the present invention. The apparatus is illustrated partially in section so as to more clearly depict the internal structural arrangement of parts for clarity of explanation. However, for purposes of clarification of explanation reference is first had to the illustration of FIG. 3. Assume a rotating chamber 66 carrying a plurality of ink jet orifices or nozzles 68 is rotated clockwise (CW) in the direction of arrow 70 by means not shown. Starting with the droplet 58 closest to the medium 60 (paper in this instance) the drop 58 following it is expelled at a time and position slightly later and displaced slightly rightwardly as seen such that the wake 72, so called, of the first drop 58 has little or no effect on the subsequent or following drop **58*a* due to the rotation of the nozzle 68, and so on for succeeding drops 58*b* and 58*c*. While the velocity vector Vp is axially aligned with the jet, there is both a horizontal vector Vh as well as a vertical vector Vv as seen. Relative to the ground the drops all have a velocity vector which is perpendicular, but since the nozzles are moving with a horizontal velocity VNh, the drops strike the paper perpendicularly as shown by arrows 74. Thus, though the droplets are one behind the other, relatively, there is no aerodynamic interaction since each drop is displaced slightly to the right (in FIG. 3**) of the previous droplet. Additionally, each drop should arrive at the recording medium in the same amount of time. Also, the droplet flight path is required to be accurately aligned for only one position in contrast to the multiple position jet arrangement where accuracy for the multiple dot positions requires individual accuracy for each of several deflection heights. The neutral drops can now be forwarded straight to the record medium 60 on their own momentum. Thus, very low deflection accuracy is required in contrast to the multiposition jet with its requirement for a relatively high degree of deflection accuracy.

Apparatus 76 embodying the present invention, as seen in FIG. 2, is characterized as a rotary scanning binary ink jet (RBIJ) assembly with fixed charging elements including fixed ink deflectors, catcher and phasing units. An annulus or ring-shaped member 78 of suitable thickness in cross section is formed, shaped, molded or cast, etc., so as to accommodate a plurality of ink jet nozzles 80 arranged around the periphery thereof in ordered, radiating, parallel, spoke-like disposition with an ink expulsion orifice 82 on the external perimeter of the ring and an ink entering chamber 84 at the rear or internal portion of the ring. Each of the ink chambers 84 is integrally interconnected by means of an annular or circular passageway 86 connected at the center of the annular member 78 to a vertically disposed ink inlet stand pipe 88. The inboard rim or wall of the passageway 86 forms a circular diaphragm 90. A circular band or ring-like crystal element (piezo-electric) 92 surrounds and abuts diaphragm 90 in face or surface contact therewith as seen in FIG. 2.

Ink 94 from an external ink source, not shown, is forced under sufficient pressure, for example 150 lbs. per square inch, into inlet pipe 96 and then into and through a rotatable coupling member 98 secured to the upper portion of the vertical stand pipe 88 to move downwardly into ink chamber 84. Thus, the ink flow is in the form of a pancake, fan-out formation from the inlet pipe to chamber 84.

A drive motor 100 including an encoder is electrically driven from a source of electrical potential, not shown, causing the entire ink jet nozzle assembly 78 to rotate clockwise (CW) in the direction of the arrow 102 while the ring crystal 92 oscillates. Slip rings 104 and electrical contact 106 apply electrical potential to the crystal assembly to cause it to vibrate the diaphragm 90 as required which actuation forces the ink 94 to pulsate in a stream as shown most clearly in FIG. 2.

In order to selectively charge the ink 94 in suitable fashion with the desired potential a pair of annular collar-like, relatively wide, ring members 108 and 110 (upper and lower charge plates respectively) are arranged adjacent to the ink outlet orifice 82 of member 78 is spaced apart, parallel relationship as seen in FIG. 2. The charge plates are individually circularly disposed in wedge-shaped arrangement with separate electrical insulation 112 disposed between sections.

Figure 3A:
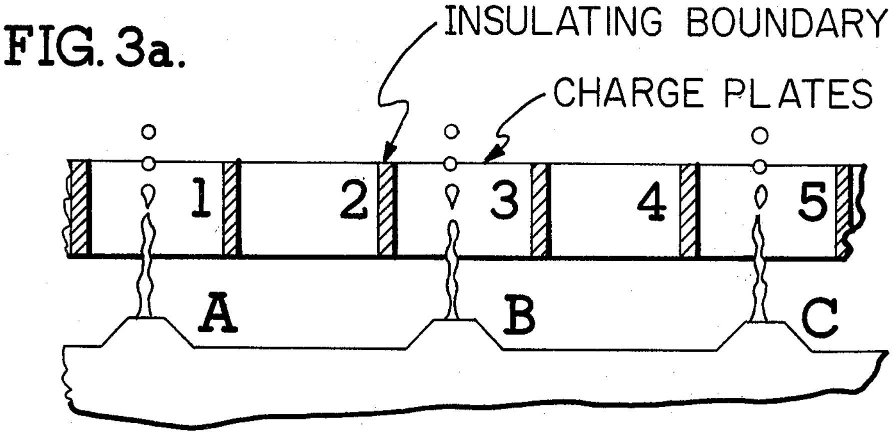
Figure 3B:
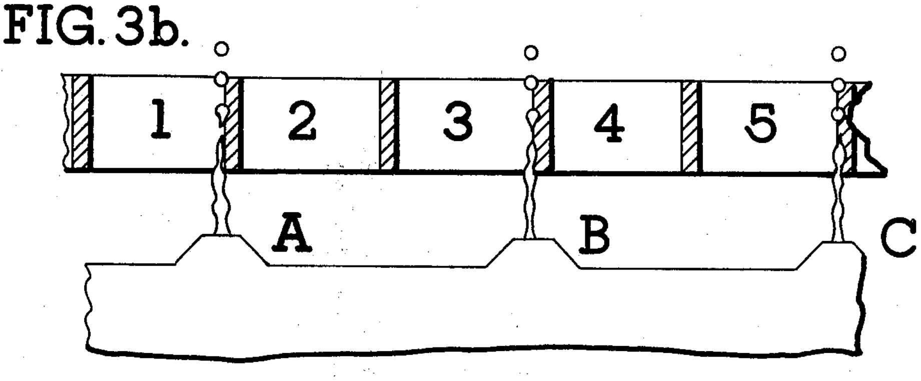
Figure 3C:
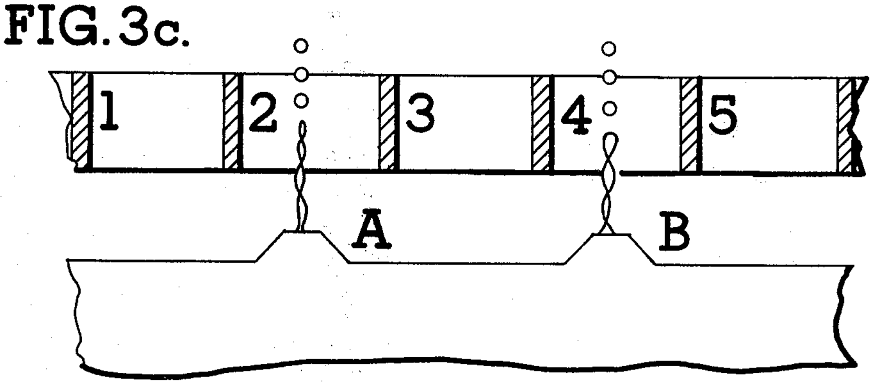

The charge plate array must track each jet to insure that the jet gets the proper charge. FIG. 3A shows jets labeled A and B issuing from the head as they move past the array of charge plates 1, 2, 3, 4 and 5. In FIG. 3B, jet A is charged by plate 1 and jet B by plate 3. When jets cross an insulated boundary between plates, as in FIG. 3C, plates 1 and 2 are both used to charge jet A, and plates 3 and 4 are charging jet B. The capacitance between jet and charge plates is reduced as the jet moves across a boundary. This capacitance variation affects charge on the drop but this is not a problem since there is a wide tolerance on drop charge. When jet A is well into the coverage of plate 2, as in FIG. 3D, then plate 2 alone is used for jet A and plate 4 for jet B. It can be seen from this discussion that there need be only twice as many charge plates as jets.

Upper and lower deflection plates 114 and 116, respectively FIG. 2, are likewise annular, ring-like conductive members arranged in separated but parallel configuration adjacent to the charge plates 108 and 110 with the space therebetween concentric and coplanar with the square between the two charge plates. The lower deflection plate 116, which is at ground potential, is made of porous material and is connected to an ink vacuum source, not shown, to drain off any ink splatter into a return member, not shown, so that the ink may then be fed back into a reservoir of the type shown in FIG. 1. Gutter 118 is concentric with lower deflection plate 116. Gutter lip 119 is coplanar (or at the same height) with lower deflection plate 116. Gutter 118 is connected to an ink vacuum source, not shown, to return the deflected and unused drops 120 to the reservoir.

For purposes of printing a line or lines of intelligible data 122 or indicia on the recording medium 124 which is generally paper, though other materials can be and sometimes are utilized for special effects or purposes, ink drops 120 are caused to impinge on the medium 124 as the medium is moved upwardly FIG. 2, angularly, helically (by means not shown) in the direction of arrows 126 against a circular shell-like structure 128 which surrounds the ink jet printing assembly 76 and forms a retaining wall or anvil for printing. The obvious displacement of the ink drops 120 relative to the paper movement enables lines of printing 122 to be simply, easily and efficiently produced due to the relative motion between the rotating ink jet and the moving paper.

Print quality of the rotary binary ink jet, referred to as RBIJ, is sensitive to phase of break-off relative to charge signal, although much less sensitive than known competitive apparatus. The phase and deviation of the charge pulse must be such that the beginning and end of the charge pulse straddle the time of droplet break-off. Two-state phasing, accomplished by checking the charge on drops as they fly into charge sensors, as seen in FIG. 4, should suffice. Charge sensors are switched to track a jet once disk rotation has the jets aim beyond the paper's edge. Charge sensors collect drop samples from a jet at two different phases. The phase resulting in the strongest charging of the drops will be the phase chosen until the disk has made a complete revolution and another phase check is made.

Print quality produced by the array of jets is also sensitive to droplet break-off length. The streams must all have the same break-off length, or if they do not, then the differences in time of flight from break-off to paper caused by break-off length difference must be known so that the chargers can be delayed or advanced accordingly. Charge sensors, FIG. 4, can additionally be used in measuring the time of flight. A drop or drops are given a large charge after a series of neutral drops. The drop or drops are sensed by the charge sensors when they hit the gutter about one millisecond later. The time between drop charging and charge sensing is an indication of the time of flight from break-off to gutter. This time of flight is used in delaying or advancing drop charging.

In order to get sufficient charge information on a particular jet, it may be necessary to gather drops from a jet for a time (T) that is longer than the period (P) between two jets passing a fixed point, FIG. 4. If T is greater than P, and one charge sense gutter were used, that gutter would have to have a mouth wider than $D_J$ to catch a jet for T longer than P. But, one P after a jet (A) started shooting into the charge sensor the jet behind it (B) would also start sending drops into the charge sensor. Two jets shooting into one charge sensor would confuse the charge sensing and would not work. Hence, a charge sensor should always have a mouth narrower than $D_J$. The $D_J$ width restriction limits a charge sensor to sampling a jet for less than one P. However, more than one charge sensor can be used such that jet A would be sensed by sensor 1 for about one P, then by 2 and 3 and so on until enough charge information had been gathered for accurate determination of phase and time of flight. Needless to say, the charge sensors must be switched such that they track a given jet.

In the event that charge sensing devices cannot accurately determine a drop's time of flight, it may be necessary to determine time of flight with a different form of sensor. A sensor made conductive by the arrival of a drop of the conductive ink 94 would be able to accurately determine the arrival time of a single drop. FIG. 5 shows two interleaving conductive combs 129*a* and 129*b* insulated from each other by narrow air spaces. An arriving drop 120 forms a conductive bridge between the upper and lower combs 129*a* and 129*b* such that a current flows and a voltage is readable across the resistor. Means, such as an air blast, is provided to clear the ink from between the combs so that the sensor can sense another drop at some later time. The sensor is placed at the same distance from the jet nozzles as the paper is in FIG. 2. The sensor would also be disposed just above gutter lip 119 and beyond the vertical edge of paper 124. (The paper does not wrap completely around the print device.) A jet sweeping past this conduction sensor would fire a neutral drop at the sensor. Electronics (not shown) compares time of arrival with time of break-off to determine the drop's time of flight.

This conduction sensor can also be used to determine the paper phasing of drop charging relative to drop break-off. A currently used phasing technique involves trying several different phases and measuring the droplet deflection associated with a particular phase. For a binary ink jet it is merely necessary to determine if one or both of two possible phases enables drops to be deflected below gutter lip 119. Since the conduction sensor is above the gutter lip, it can be used to detect drops insufficiently charged for deflection below the gutter lip, hence indicating a bad phase.

In the event that aerodynamic forces caused by rotation of ring 78 tend to interfere with the accurate placement of drops 120, then a tunnel like structure 130, FIG. 6, is extended from orifice 82 through the charging means 108 and 110, through the deflection means 114 and 116, and up to but not in contact with the paper 124. Tunnel 130 is provided with an internal diameter much greater than the ink stream diameter. Tunnel 130, which is fixed to and rotates with ring 78, sweeps through the gaps between charging electrodes 108 and 110 and deflection plates 114 and 116 protecting the drops from aerodynamic forces acting perpendicular to the drop's flight path. Air (arrows 132) from a fixed toroidal manifold 134 flows to a rotating air inlet 136. Rotary seal 138 prevents leakage between the fixed faces of manifold 134 and moving faces of air inlet 136. The tunnel 130 has a wide section extending from the ring 78 through the charge plates 108 and 110. This section necks down in width and cross sectional area to a narrow section that moves through the deflection plates 114 and 116. This necking down of the tunnel causes the air flow in the tunnel to accelerate such that the air 132 surrounding the drops 120 is moving nearly as fast as those drops as they pass between the deflection plates. This reduces the aerodynamic interaction between drops and provides a blasting action to clean ink off the wall of tunnel 130. The tunnel 130 is curved to allow for the curvature of the drop flight path relative to the rotating ring 78 caused by coriolis acceleration.

As previously mentioned herein, each ink jet nozzle must be oriented or aimed relative to the moving medium 124 (although once aimed, the orientation is or may be fixed) so as to cause the individual droplets from each orifice or jet to strike the medium at a precise position repetitively as called for by the electronics (not shown) of the printing apparatus.

A novel adjustable ink jet printing head structure 140 is shown schematically in FIGS. *7a–7d* inclusive and in greater detail in FIG. 8, as will now be described. Ring-shaped annulas or hub 78 is provided with a plurality of enlarged ink receiving and circulating chambers 142 radiating outwardly from the hub center in spoke-like fashion. The forward, outer end portion of each chamber 142 is spherically molded or shaped into a receptacle or socket as at 144, FIG. 8. A spherical, ball shaped member 146 (similar to an automobile ball joint) is provided having a needle shaped ink outlet opening 148 in one side connected with an anterior funnel shaped ink chamber 150 at the opposite side of the ball opening into an inlet ink passageway 152.

The inlet passageway 152 is shaped to slideably receive the forward end of an adjusting tool 154 as seen most clearly in FIG. 8*a*. The sphere or ball 146 carried by the tool is then press fitted into the socket-like opening 144 and is rotatable therein, e.g. arrow 156, FIG. 8, by means of the tool 154 for orienting the outlet orifice toward the recording medium (not shown).

The elongated rod-like tool 154 is provided with a central hollow pipe or opening 158 extending therethrough for introducing ink under pressure into and through the pipe and into the spherical ball 146. By this means the ball 146 can be physically rotated and oriented while the ink stream issuing from the outer orifice 148 can be observed and monitored with a microscope from above and with suitable microscope grids from the sides. Each spherical ball jet head 146 once oriented or angled "off" the perpendicular with respect to the drive shaft of the rotating assembly 78 is thereafter fixed in position so as to provide an accurate ink droplet spot 120, FIG. 2, on a recording medium 124.

As seen in FIGS. *7a* and *7c*, the annular member 78 is provided with a plurality of spherical receptacles 144 into which spherical ball ink jet head members 146 are adapted to be press fitted. A form of prior art assembly, as illustrated in FIGS. *7b* and *7c*, comprises individual, demountable, staggered plate members 160 of triangular configuration permitting sufficient clearance between members and secured to the outer periphery of annulus 78 by means of bolts 162 and O-rings 164. A jeweled orifice 166 in each assembly provides a relatively precise ink metering device to produce the desired size ink jet. Each orifice 166 is axially oriented relative to the outlet orifice 168 of its associated ink jet and diaphragm assembly.

A novel modification of the present invention is illustrated in FIG. 9 wherein the spherical ink jet head previously described with respect to FIGS. *7a, 7c,* 8 and 8*a* is seen to be a self-contained demountable, adjustable unitary assembly relative to the spherical receiving chamber of the annulus 78. This embodiment of the invention is characterized as an adjustable aim ink jet head having three degrees of freedom. A rigid, spherical, ink jet body member 170 is captivated within a spherical receptacle or housing 172 in the annulus 78. Member 170 is provided with an enlarged irregularly shaped central opening 174 extending through from side to side of the spherical member 170 forming a receptacle for receiving a threadedly insertable internally funnel shaped ink cavity forming member 176. Disposed within the rear portion of an enlarged opening 178 in member 170 is a rigid support or holder member 180 for an ink diaphragm 182 which encloses the rear of funnel or cone shaped cavity member 176 and is disposed in surface contact with a piezo-electric crystal driving member 184. Energizing lead lines 186 for crystal 184 extend outwardly away from the assembly for attachment to associated electrical circuitry, not shown. An ink inlet tube 188 connects an external ink supply, not shown, with the ink cavity 190.

A jet head positioning socket 192 is located at the base of holder 180 permitting the jet body 170 to be rotatively positionable to aim the ink jet through the jeweled orifice 194 onto the associated recording medium, not shown.

What is claimed is:

1. Rotary scanning ink jet apparatus having fixed charging, deflecting, ink catching and phasing devices comprising:

a plurality of movable ink jet forming members, means for rotatively moving said ink jet forming members relative to a data receiving member, a plurality of ink charging members fixed relative to said ink jet forming members and arranged relative to said ink forming members so as to permit ink from said jet members to be passed between said charging members in a direction towards said data receiving member, a plurality of deflector members fixed relative to said ink jet forming members and similarly arranged as said charging members so that said ink from said jet members passes between said deflector members towards said data receiving members, an ink receiving or catching member disposed adjacent to said deflector members effective to receive that portion of the ink from said jet members which is not directed to the data receiving member as said jet members are moved relative thereto, means operably associated with said jet forming members for causing ink to be expelled from said jet forming members in the form of minuscule droplets for ultimate impingement on said data receiving member, and means for producing relative movement between said ink jet forming members and the fixed members while said data receiving member is moved relative to said fixed members effective upon energization of said droplet forming member to produce intelligible lines of dots of information or data on said data receiving member.

2. The invention in accordance with claim 1 wherein said means for rotatably moving said jets includes slip rings and contacts for supplying electrical potential to the rotative means wherein the voltage and polarity are constant with time and flexible coupling means for coupling an ink inlet from an ink reservoir to a plenum chamber adjacent to said ink jets for distributing said ink to said jets under suitable head pressure.

3. The invention in accordance with claim 1 wherein said movable ink jet forming members are spherical in shape and are arranged within an individual spherical receptacle in the rotating ink jet assembly and including means for receiving an ink orienting tool member for precisely aiming each jet effective to produce a desired trajectory of droplets toward said data receiving member as said ink jets are rotated relative to said data receiving member.

4. The invention in accordance with claim 1 further including a self-contained insertable/removable spherical ink jet member comprising:

a jeweled orifice at one side of the spherical ink jet body, a demountable securement for mounting an ink pulsing diaphragm thereto, further including a crystal holder for pulsing said diaphragm to create ink droplets on damand from said orifice, and jet positioning means integral therewith enabling said self-contained unit to be physically oriented in a direction to provide an arcuate ink droplet trajectory for applying ink droplet data to a data receiving member moving relative thereto.

5. The invention in accordance with claim 1 further including an electrical phasing device comprising a pair of interleaved comblike conductive members each of which is electrically connected to a suitable source of electrical potential and wherein each of the interleaving portions of said comblike members is offset or slightly separated from each other to provide a minimal insulating air gap therebetween so that contact of the conductive ink droplets with respect thereto thus determines the time of drop arrival at the sensing means effective to coordinate the charging of the ink jet array and for determining the proper phase of charging for the particular jet firing and expelling the ink drop.

6. The invention in accordance with claim 1 wherein charging members are shaped in the form of a pair of concentric, parallel, spaced apart annular elements disposed adjacent said ink jet assembly effective to enable ink droplets from said ink jets to pass between the opposed annular elements toward the data receiving member in accordance with the electrical charge on said ink droplets.

7. The invention in accordance with claim 6 wherein each of said annular elements comprises a segmented, ringlike member having suitable dielectric insulation separating each segment from the adjacent segment and wherein each segment is shaped substantially in the form of a truncated wedge configuration.

8. The invention in accordance with claim 1 wherein said plurality of deflecting members comprises a pair of parallel, concentrically opposed conductive, ringlike members separate a sufficient distance from each other to permit ink droplets to pass unopposed therebetween in their flight toward the data receiving member in accordance with a deflecting voltage between said deflecting members.

9. The invention in accordance with claim 8 wherein the deflecting members are provided with a desired electrical polarity in accordance with the charge placed on the ink droplets as they are passed between said charging members so as to cause said ink droplets to move either toward said data receiving member or into said catcher member.

10. The invention in accordance with claim 1 wherein said catcher member comprises a ringlike element having an inwardly curved channel or groove therein and being concentric with said charging and said deflecting members, said catcher member being integral with said lower deflecting member and wherein the upper surface portion of said catcher member is disposed level with the upper surface of the lowermost concentric deflecting ringlike member.

11. The invention in accordance with claim 10 wherein said catcher member includes a lower porous portion permitting ink received thereon to be removed therefrom as by vacuum or suction.

12. The invention in accordance with claim 1 further including a toroidal air applying means and a shaped air plenum chamber shaped to conform to the desired trajectory for the ink droplets in their flight path from the ink jet to the data receiving member and wherein said latter chamber is fixed intermediate the concentric charge means, deflecting means and said catcher member.

13. The invention in accordance with claim 11 wherein said toroidal air conducting duct is provided with suitable air sealing means to prevent the escape of the entering air and to force said air into and parallel with the flight path of said ink droplets.

* * * * *